United States Patent Office 3,020,223
Patented Feb. 6, 1962

3,020,223
MANUFACTURE OF HYDRAZINE
Jean P. Manion, Milwaukee, Wis., assignor to Olin Mathieson Chemical Corporation, a corporation of Virginia
No Drawing. Filed Aug. 25, 1958, Ser. No. 757,142
2 Claims. (Cl. 204—177)

This invention relates to the manufacture of hydrazine and provides an improved process for the production of hydrazine by the treatment of ammonia in an electric discharge in the presence of certain substances effective to enable the obtainment of increased yields and concentrations of the product.

It has long been known that ammonia can be decomposed in an electric discharge to elementary nitrogen and hydrogen, and that under certain conditions, part of the ammonia decomposed can be converted to hydrazine. However, as summarized in "The Chemistry of Hydrazine" by Audrieth (Wiley, 1951), page 24, the yields of hydrazine thus produced have been disappointing as the percentage of ammonia decomposed was quite low under conditions giving the most favorable yields, and yields in terms of energy input have been discouraging.

The passage of an electric discharge through gaseous ammonia under proper conditions has been shown to result in activated ammonia molecules, which yield amino radicals ($NH_2$) and hydrogen atoms. Hydrazine molecules result from the union of pairs of amino radicals, but the yields are low partly because this reaction must compete with the re-formation of ammonia by reaction of an amino radical with a hydrogen atom and by reaction of hydrazine with hydrogen atoms.

The main object of this invention is to provide a process for the production of hydrazine by treatment in an electric discharge, wherein the treatment is effected in the presence of an added substance for attaining improved results. A further object is to provide certain additives in the electric discharge process for converting ammonia to hydrazine whereby improved yields and higher concentrations of the product may be obtained. Other objects will appear from the following detailed description.

The foregoing objects have been accomplished in accordance with this invention by subjecting ammonia to electric glow discharge treatment in the presence particularly of allyl compounds and in general, of acylic compounds characterized by ethylenic unsaturation and containing two to eight carbon atoms. The above organic additive compounds are preferably utilized within low concentration limits and are effective to increase the energy yield of the hydrazine produced and likewise enable the formation of the hydrazine product at substantially higher concentrations than obtained in the processes of the prior art. Both factors are important in furthering the practical utilization of the manufacture of hydrazine by the electric discharge treatment of ammonia.

Advantages obtainable in accordance with this invention are shown in the following illustrative examples, concentration and yield of hydrazine product being determined after electric glow discharge treatment of ammonia with and without additives. Unless otherwise indicated, the measurements were made at a pressure of 5 mm. of mercury, using an electric discharge current of 40 milliamperes passed between electrodes 20 centimeters apart in a vessel 2.4 centimeters in diameter and a gas stream at a linear flow velocity of 526 centimeters per second. The "$N_2H_4$ concentration ratio" is the value obtained by dividing the concentration in percent by weight of hydrazine produced in the presence of additive by the concentration obtained in the absence of the additive. The "yield ratio" is the value obtained by dividing the grams of hydrazine per kilowatt hour of electrical energy produced in the presence of additive by the yield of the absence of additive.

| Example | Additive | Mole Percent Additive | $N_2H_4$ Concn. Ratio | Yield Ratio |
|---|---|---|---|---|
| 1 | Allyl amine | 0.25 | 2.6 | 2.5 |
|   |   | 1.0 | 3.4 | 2.9 |
|   |   | 2.5 | 3.6 | 2.4 |
|   |   | 5.0 | 3.0 | 1.6 |
| 2 [1] | do | 0.07 | 1.4 | 1.7 |
|   |   | .19 | 1.6 | 1.9 |
|   |   | 1.2 | 1.7 | 2.1 |
|   |   | 2.2 | 1.7 | 2.0 |
| 3 [1] | Allyl alcohol | 0.07 | 1.3 | 1.6 |
|   |   | .19 | 1.4 | 1.6 |
|   |   | .50 | 1.4 | 1.7 |
|   |   | .75 | 1.5 | 1.8 |
|   |   | 1.0 | 1.5 | 1.7 |
|   |   | 2.0 | 1.4 | 1.7 |
| 4 [2] | do | 0.07 | 1.6 | 2.1 |
|   |   | .19 | 1.9 | 2.4 |
|   |   | .5 | 2.5 | 2.4 |
|   |   | .75 | 2.2 | 2.1 |
| 5 | Allyl chloride | 0.07 | 1.3 | 1.3 |
|   |   | .25 | 1.9 | 1.6 |
|   |   | .50 | 1.5 | 1.2 |
|   |   | .70 | 1.4 | 1.1 |
| 6 | Ethylene | 0.15 | 1.5 | 1.4 |
|   |   | .25 | 1.6 | 1.4 |
|   |   | .50 | 1.5 | 1.3 |
|   |   | 1.8 | 1.5 | 1.4 |
|   |   | 2.5 | 1.4 | 1.2 |
| 7 | Isotubylene | 0.10 | 1.1 | 1.2 |
|   |   | .25 | 1.7 | 1.6 |
|   |   | .50 | 2.0 | 1.8 |
|   |   | 1.0 | 2.5 | 1.9 |
|   |   | 1.8 | 2.1 | 1.6 |
|   |   | 2.6 | 1.9 | 1.4 |
| 8 | Chlorotrifluoroethylene | 0.02 | 1.6 | 1.7 |
|   |   | .04 | 1.6 | 1.7 |
|   |   | .20 | 1.6 | 1.7 |
|   |   | .40 | 1.5 | 1.3 |
|   |   | .60 | 1.3 | 1.1 |
| 9 | Trimethylethylene | 0.05 | 1.7 | 1.7 |
|   |   | .10 | 2.0 | 2.1 |
|   |   | .25 | 1.8 | 1.8 |
|   |   | .50 | 2.3 | 1.7 |
|   |   | 1.0 | 1.2 | 1.2 |
| 10 | Butadiene | 0.25 | 1.5 | 1.5 |
|   |   | .50 | 1.7 | 1.5 |
|   |   | .75 | 1.6 | 1.2 |
|   |   | 1.0 | 1.5 | 1.1 |

[1] Gas flow rate of 5200 cm./sec.
[2] Gas flow rate of 376 cm./sec.; interelectrode distance of 25 cm.

In contrast with the favorable effects on yield and concentration of hydrazine produced by the listed additives, only slight and sometimes disadvantageous effects resulted from the admixture with the ammonia being treated of low concentrations of nitrogen, oxygen, nitrous oxide, nitric oxide, iodine, mercury, or propane.

In the above specific examples, the actual yields obtained ranged from several to close to thirty grams of hydrazine per kilowatt-hour, and it was possible to obtain the hydrazine at a concentration of about 0.70% by weight in a single pass, higher concentrations being obtainable by recycling the mixture of hydrazine, ammonia and additive. The importance of the additive is that both the energy yield and the concentration of hydrazine may be increased by its use under a variety of reaction conditions.

Thus, the electric discharge treatment of ammonia in the presence of additive to accomplish improved production of hydrazine may be a direct current, alternating current, or pulsating direct current discharge treatment.

The treatment should be effected at a low pressure, generally within the limits of about 3 to 50 millimeters of mercury, and preferably between 5 and 15 millimeters of mercury. The temperature may conveniently be at about ordinary room temperature, but it may be advantageous at times to maintain the electric discharge vessel elevated temperature of up to 200° or 300° C.

The electric discharge apparatus may be of any convenient type and arrangement, for example, as disclosed in Devins and Burton application Serial No. 552,497, filed December 12, 1955, now U.S. Patent 2,849,357, or as disclosed in the Manion application Serial No. 473,813, filed December 8, 1954, now U.S. Patent 2,849,356, utilizing a discharge electrode having a surface of an alkali or alkaline earth metal or oxide thereof. The ammoniacal gas stream may be flowed through the electric discharge axially as in the foregoing examples or transversely as disclosed in the applications referred to above.

Generally, the additive is mixed with the ammoniacal gas stream prior to the treatment in the electrical discharge. However, when the gas flow is in the direction of the discharge, advantage may at times be obtained by injecting the additive in the desired proportion into the gas stream within the electric discharge vessel so that it first enters within the positive column in the discharge without direct contact with the cathode.

The ammoniacal gas may be passed through the electric discharge at any desired rate, preferably such that the linear rate is within two or three hundred to five or six thousand centimeters per second, the higher rates generally leading to increased energy yields of product. The discharge current is generally maintained within the range of several milliamperes to about fifty or sixty, best results being obtained usually at about ten to forty milliamperes.

The additive is effective at low concentrations within the range of about 0.05 to not more than about 5 mole percent, that is, about 0.05 to 5 percent by volume, of the ammoniacal gas, as concentrations lower than the above minimum do not consistently display the desired advantages while concentrations higher than the stated maximum provide no added advantages and may even exert deleterious effects. Preferably, the concentration of the additive is maintained within about 0.1 and 1.0 mole percent for effecting the greatest improvement in the process.

The allyl compounds are most highly preferred, particularly allyl amine. Olefines, particularly those containing two to eight carbon atoms are likewise advantageous within the above concentration limits and impart advantages similar to the above results listed for Examples 6 to 10, propylene being about as effective as ethylene, and 1-butene, 1-pentene and 1-hexene have about the same effectiveness as isobutylene. It is also to be understood that mixtures of two or more of the foregoing additives may be advantageously employed within the stated low concentration limits to improve the production of hydrazine from ammonia by electric discharge.

I claim:

1. The process of preparing hydrazine which comprises subjecting an ammoniacal gas to an electrical glow discharge, said gas containing 0.05 to 5% by volume of an acyclic allyl compound chosen from the group consisting of allyl amine, allyl alcohol, and allyl chloride.

2. The process of preparing hydrazine which comprises subjecting an ammoniacal gas to an electrical glow discharge, said gas containing about 0.1 to 1% by volume of allyl amine.

References Cited in the file of this patent

UNITED STATES PATENTS

| | | |
|---|---|---|
| 2,736,693 | Gunning et al. | Feb. 28, 1956 |
| 2,749,298 | Thomas | June 5, 1956 |
| 2,849,357 | Devins et al. | Aug. 26, 1958 |

OTHER REFERENCES

Westhaver: Journal of Physical Chemistry, vol. 37 (1933), pages 897–905.

Glockler and Lind: The Electro-Chemistry of Gases and other Dielectrics, 1939, pages 207, 209, 210 and 212.